(12) United States Patent
Riley et al.

(10) Patent No.: US 10,628,058 B1
(45) Date of Patent: Apr. 21, 2020

(54) SYSTEM FOR ELECTRONIC DATA VERIFICATION, STORAGE, AND TRANSFER

(71) Applicant: BANK OF AMERICA CORPORATION, Charlotte, NC (US)

(72) Inventors: Mary Kathleen Riley, Denver, NC (US); Renee Marie Melin, Stanley, NC (US); Todd David Abbott, Charlotte, NC (US); Timothy Lamonte Atwell, Huntersville, NC (US); Edward W. Carroll, Charlotte, NC (US); Paresh Bhagwandas Chande, Charlotte, NC (US); Michele Barker Fasciana, Charlotte, NC (US); Douglas David Foley, Charlotte, NC (US); Bryan L. Ford, Allen, TX (US); Christopher Ryan Galloway, Charlotte, NC (US); James Grae Garrison, Charlotte, NC (US); Brian P. Gibbons, Davidson, NC (US); Kecia Marie Heidebrecht, Chicago, IL (US); Gayle Tawanda Jackson, Charlotte, NC (US); Jeffrey Morse Larmondra, Concord, NC (US); Kimberly Lynn Lewis, Charlotte, NC (US); Srinivasa D. Madireddi, Flower Mound, TX (US); Gautam Suryakant Nipanikar, Concord, NC (US); Michael Harold Perry, Cornelius, NC (US); Laurie Readhead, Charlotte, NC (US); Prakash Srinivasan, Matthews, NC (US); Kyle S. Sorensen, Huntersville, NC (US); Constance Jones Suarez, Charlotte, NC (US); Jeffrey Roger Walls, Charlotte, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 253 days.

(21) Appl. No.: 15/498,130

(22) Filed: Apr. 26, 2017

Related U.S. Application Data

(60) Provisional application No. 62/459,310, filed on Feb. 15, 2017.

(51) Int. Cl.
*G06F 3/06* (2006.01)

(52) U.S. Cl.
CPC .......... G06F 3/0622 (2013.01); G06F 3/067 (2013.01); G06F 3/0637 (2013.01); G06F 3/0647 (2013.01)

(58) Field of Classification Search
None
See application file for complete search history.

(56) References Cited

U.S. PATENT DOCUMENTS

| 5,448,727 A | 9/1995 | Annevelink et al. |
| 6,256,640 B1 | 7/2001 | Smalley et al. |

(Continued)

*Primary Examiner* — Charles Rones
*Assistant Examiner* — Jonah C Krieger
(74) *Attorney, Agent, or Firm* — Michael A. Springs; Moore & Van Allen PLLC; Nicholas C. Russell

(57) ABSTRACT

Embodiments of the invention are directed to systems, methods, and computer program products for verifying, storing, and transferring data within an entity. The system is configured for receiving data from one or more source systems, generating a metadata, exposure, and control statement for the data, transferring the data and the metadata, exposure, and control statement to a system of origination, logically classifying the data in the system of record into one or more domains, transferring the data into one or more authorized data sources associated with the one or more domains, receiving a request from a user associated with a target system to retrieve a set of data from the one or more (Continued)

authorized data sources, and transferring the set of data from the one or more authorized data sources to the target system.

20 Claims, 12 Drawing Sheets

(56) References Cited

U.S. PATENT DOCUMENTS

| | | | |
|---|---|---|---|
| 7,523,135 B2 | 4/2009 | Bradford et al. | |
| 7,865,382 B2 | 1/2011 | Menon et al. | |
| 8,166,001 B1 | 4/2012 | Grieves et al. | |
| 8,396,737 B2 | 3/2013 | Lakshminarayan et al. | |
| 8,607,017 B2 | 12/2013 | Condict | |
| 9,213,715 B2 | 12/2015 | Chambliss et al. | |
| 9,607,177 B2 | 3/2017 | Jejurikar et al. | |
| 2002/0023109 A1 | 2/2002 | Lederer, Jr. et al. | |
| 2003/0018878 A1 | 1/2003 | Dorward et al. | |
| 2003/0065690 A1 | 4/2003 | Kelley | |
| 2004/0139053 A1 | 7/2004 | Haunschild | |
| 2005/0197952 A1 | 9/2005 | Shea et al. | |
| 2006/0129441 A1 | 6/2006 | Yankovich et al. | |
| 2006/0235715 A1* | 10/2006 | Abrams | G06Q 40/04 705/1.1 |
| 2007/0006294 A1 | 1/2007 | Hunter | |
| 2007/0011134 A1 | 1/2007 | Langseth et al. | |
| 2007/0242607 A1 | 10/2007 | Sadler et al. | |
| 2009/0241117 A1* | 9/2009 | Dasgupta | G06F 9/5038 718/101 |
| 2010/0027430 A1* | 2/2010 | Moore | H04L 43/12 370/252 |
| 2010/0332452 A1 | 12/2010 | Hsu et al. | |
| 2011/0099351 A1 | 4/2011 | Condict | |
| 2011/0302163 A1 | 12/2011 | Rhinelander et al. | |
| 2012/0191670 A1 | 7/2012 | Kennedy et al. | |
| 2013/0311739 A1 | 11/2013 | Kawakami et al. | |
| 2014/0195499 A1 | 7/2014 | Amit et al. | |
| 2014/0358857 A1 | 12/2014 | Chambliss et al. | |
| 2014/0365253 A1 | 12/2014 | Byers et al. | |
| 2015/0082045 A1* | 3/2015 | D'Souza | H04L 9/0891 713/176 |
| 2016/0112407 A1* | 4/2016 | Nara | H04L 67/1095 726/5 |
| 2018/0225310 A1* | 8/2018 | Fuglsang | G06F 16/2452 |
| 2018/0330428 A1* | 11/2018 | Rosenthal | H04L 63/0815 |

* cited by examiner

SYSTEM FOR ELECTRONIC DATA VERIFICATION, STORAGE, AND TRANSFER

CROSS-REFERENCE OF RELATED APPLICATIONS

This application claims priority to U.S. Provisional Patent Application Ser. No. 62/459,310, filed Feb. 15, 2017, entitled "System for Electronic Data Verification and Storage," the entirety of which is incorporated herein by reference.

FIELD OF THE INVENTION

In general, embodiments of the invention relate to electronic data verification, storage, and transfer, in particular, embodiments of the invention relate to system, methods, and computer program products for governing the data flow within an entity.

BACKGROUND

An entity receives significant volumes of data constantly. Due to these significant volumes of data, it is often difficult to control the flow of data and accuracy of the data in real-time. As such, a need exists for an improved way of governing the data.

BRIEF SUMMARY

The following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

The present invention provides the functional benefit of defining data provisioning sources, capabilities and standards as enterprise owned, and to be designed to address enterprise needs. This is done by establishing the enterprise needs as the highest priority and focusing on emerging exposure data aggregation requirements. It is imperative that the data provisioning sources are sanctioned by the enterprise using one or more fact based criteria such as cost, content, quality, latency, security, or the like. In this regard, the present invention may design an open architecture to enable integration of data from one or more platforms and maximize flexibility to meet future needs.

Embodiments of the present invention address the above needs and/or achieve other advantages by providing apparatuses (e.g., a system, a computer program product comprising computer program code stored on a non-transitory computer-readable medium which is readable by a computer, and/or other devices) and computer implemented methods for governing data within an entity. The invention including: receiving data from one or more source systems; verifying that the data received from the one or more source systems meets a set of rules, wherein the set of rules are based on entity requirements; generating a metadata, exposure, and control statement in response to verifying that the data received from the one or more source systems meets the set of rules; transferring the data and the metadata, exposure, and control statement to a system of origination; validating the data and the metadata, exposure and control statement stored in the system of origination; transferring the data and the metadata, exposure, and control statement from the system of origination to a system of record; logically classify the data into one or more domains based on the metadata, exposure, and control statement; and transferring the data into one or more authorized data sources associated with the one or more domains based on the logical distribution of the data.

In some embodiments, the invention further comprises receiving first request from a first user to retrieve a first set of data from a first authorized data source of the one or more authorized data sources, wherein the first set of data is utilized to generate a report; prompt the first user initiating the first request to retrieve the first set of data to identify a set of elements from a data dictionary required for generating the report; validate that the set of elements identified by the user match one or more parameters associated with the first authorized data source; register the set of elements with the first set of data and transfer the first set of data; and create a record in the first authorized data source based on transferring the set of data and registering the set of elements with the first set of data, wherein the record is utilized to control reporting processes.

In some embodiments, the invention further comprises receiving a second request from a second user to retrieve a second set of data from a second authorized data source of the one or more authorized data sources for generating the report; prompting the second user to identify the set of elements from the data dictionary required for generating the report; comparing the set of elements identified by the user with historical records in the one or more authorized data sources; identifying a discrepancy based on comparing the set of elements with the historical records in the one or more authorized data sources; and generating an alert and notify the second user and the first user about the identified discrepancy.

In some embodiments, the invention further comprises analyzing the data to identify data inconsistencies and data redundancies and implementing one or more actions to eliminate data inconsistencies and data redundancies, wherein the one or more actions comprises at least reconciling the data.

In some embodiments, the invention further comprises creating a system and file document based on transferring the data from the system of origination to the system of record.

In some embodiments, the invention further comprises updating the system and file document based on transferring the data from the system of record to one or more authorized data sources.

In some embodiments, the invention further comprises transferring the data via a shared network data mover.

BRIEF DESCRIPTION OF THE DRAWINGS

Figure 1:
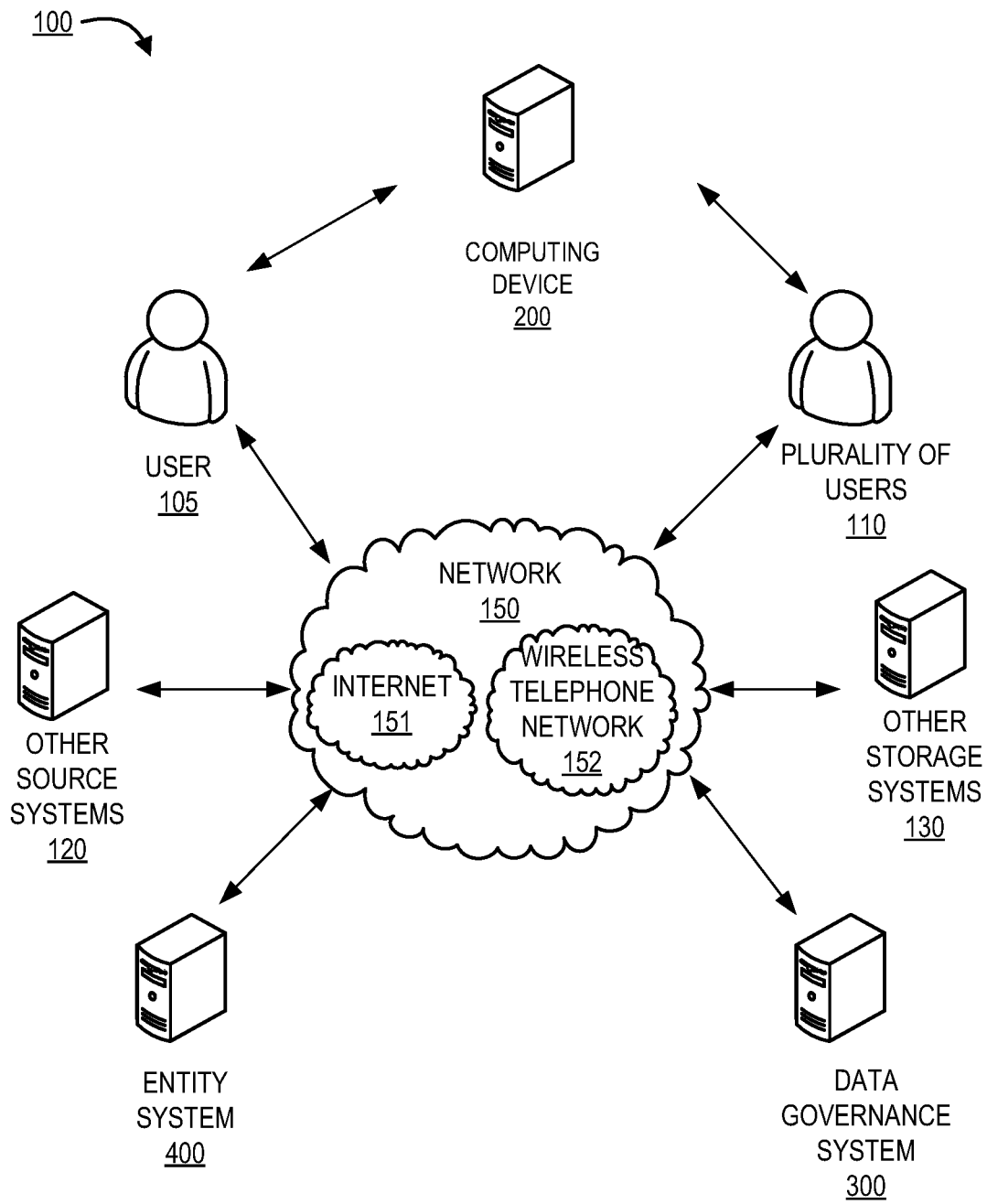
Figure 2:
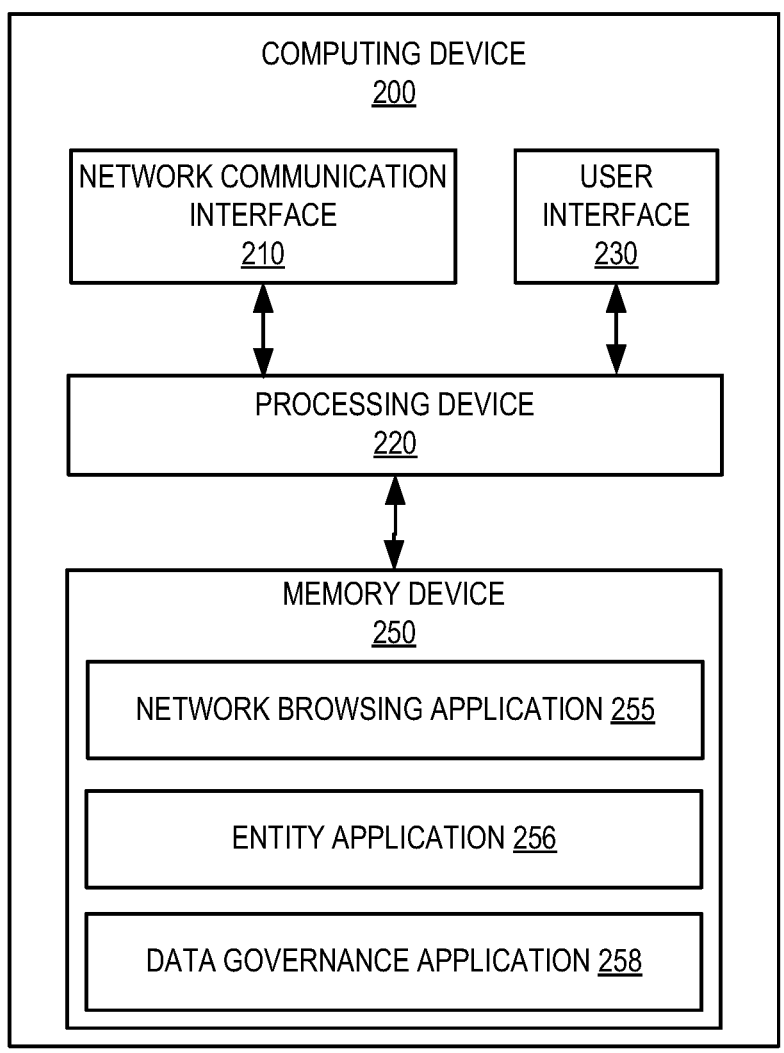
Figure 3:
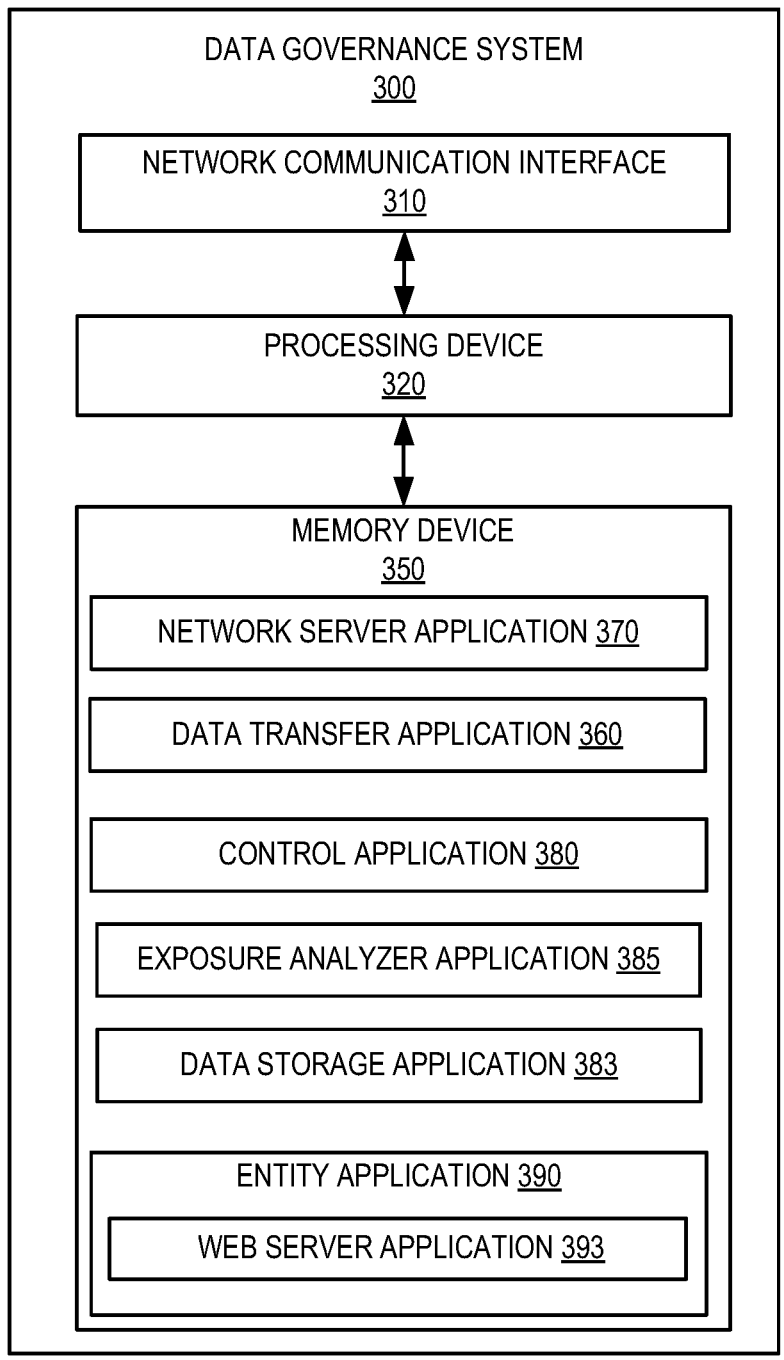
Figure 4:
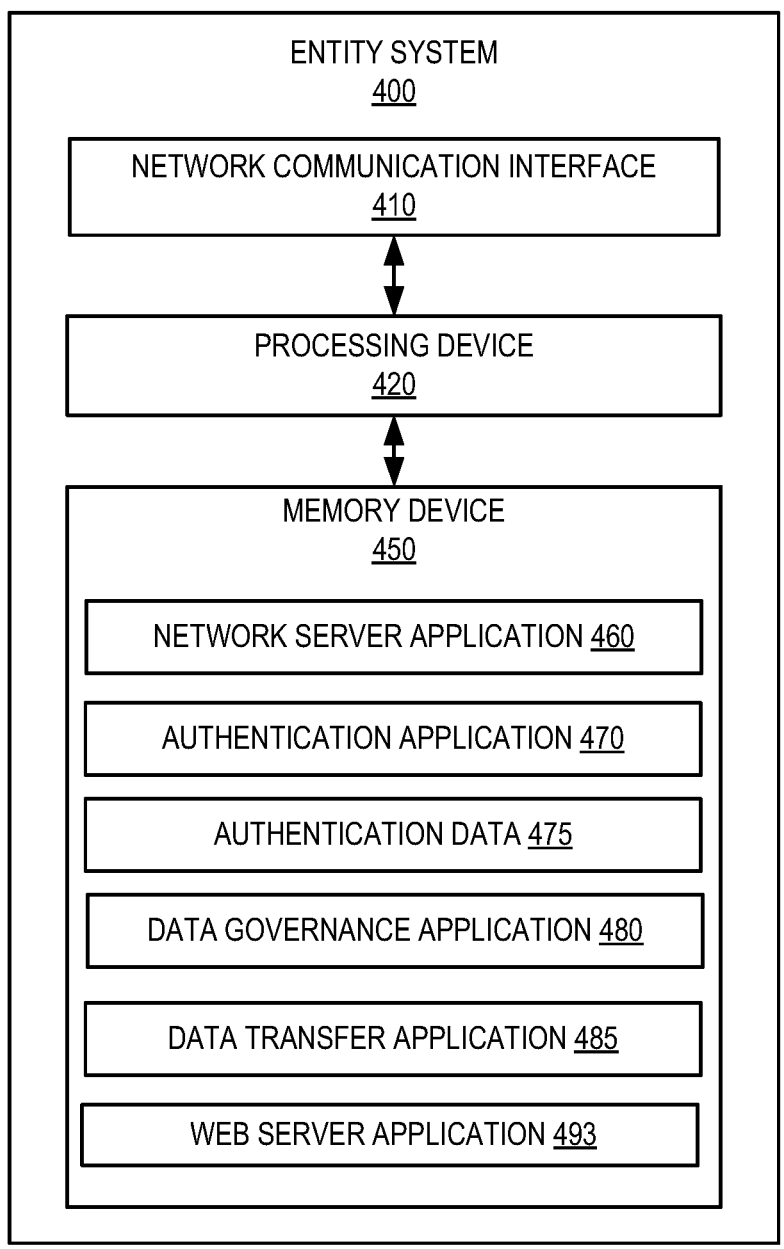
Figure 5:
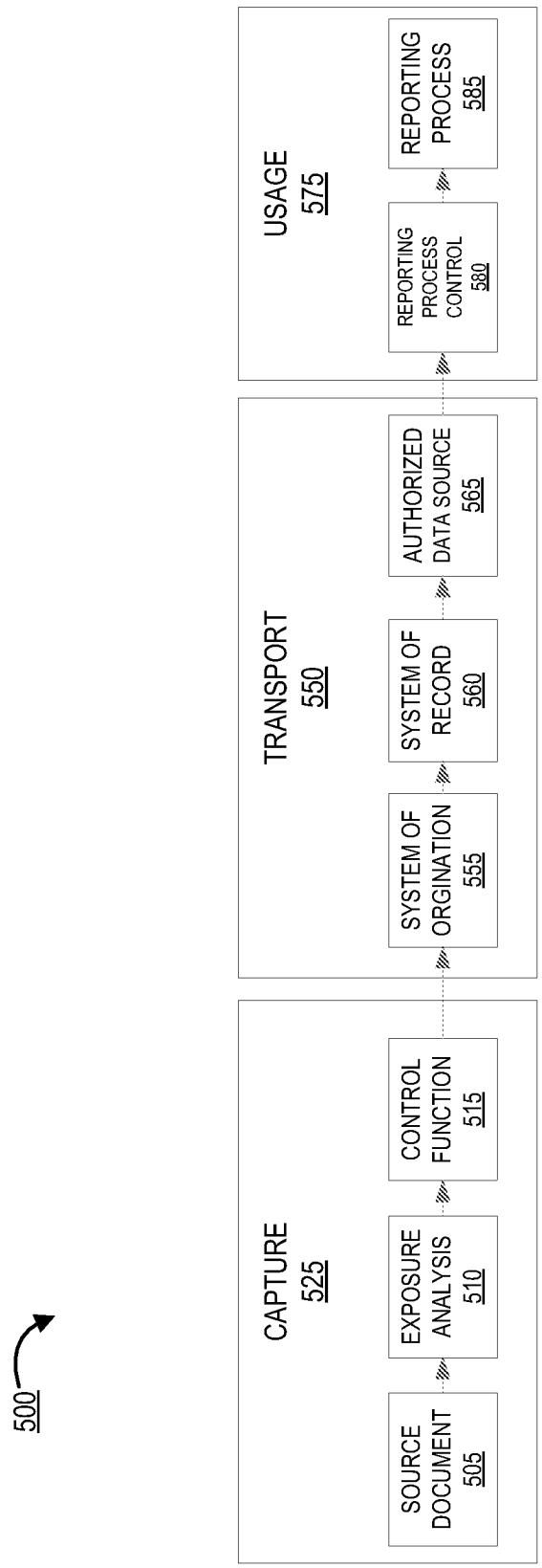
Figure 6:
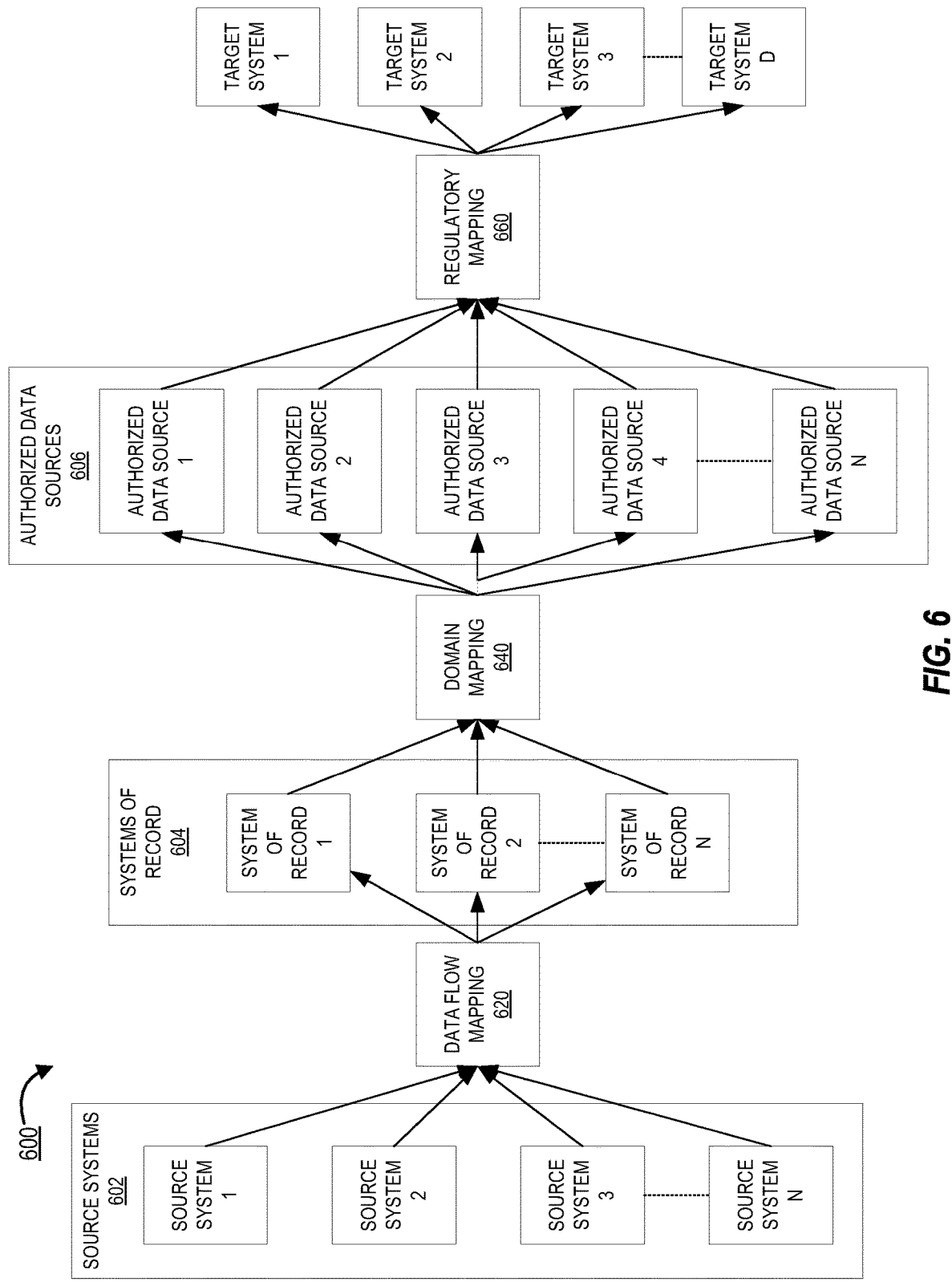
Figure 7A:
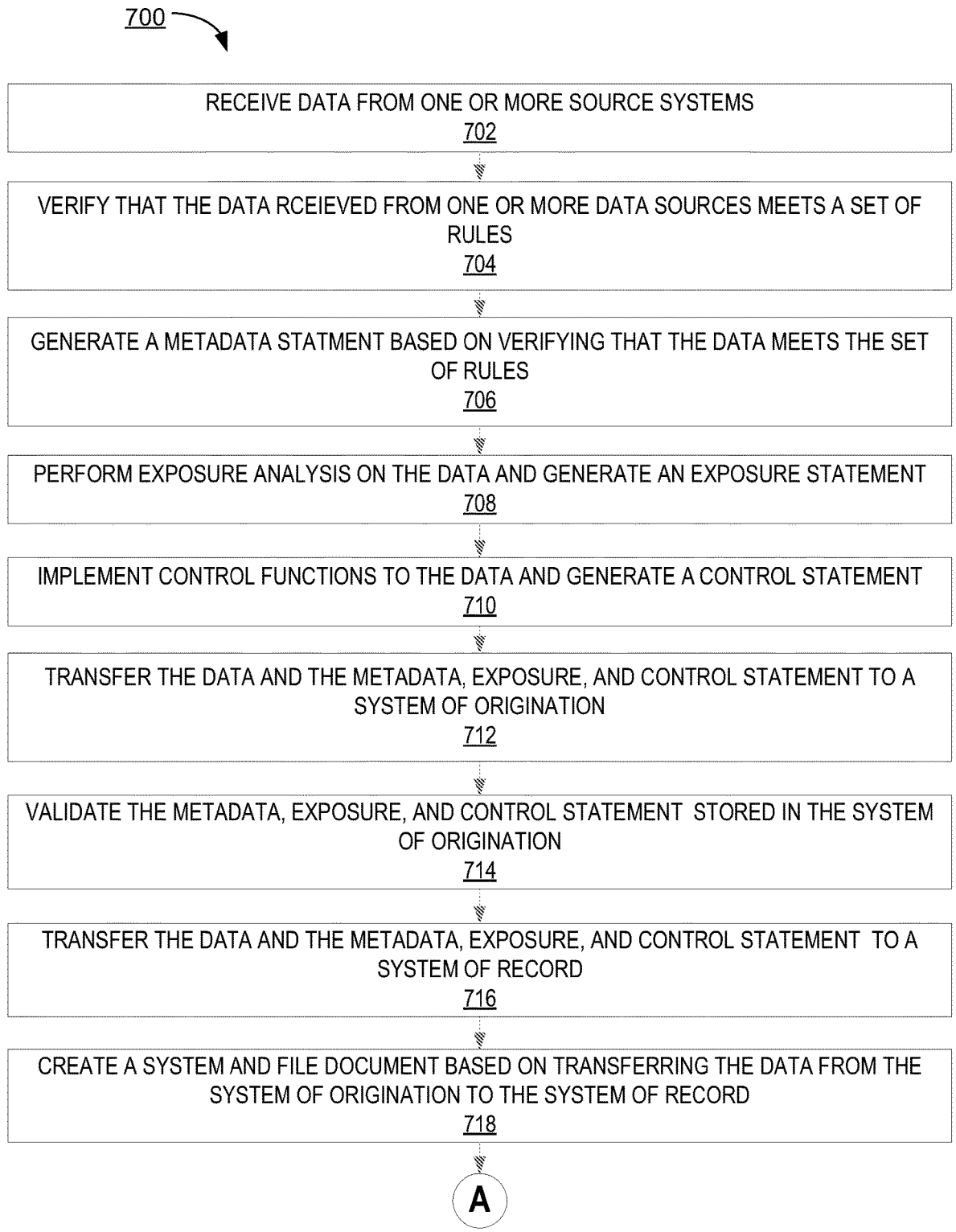
Figure 7B:
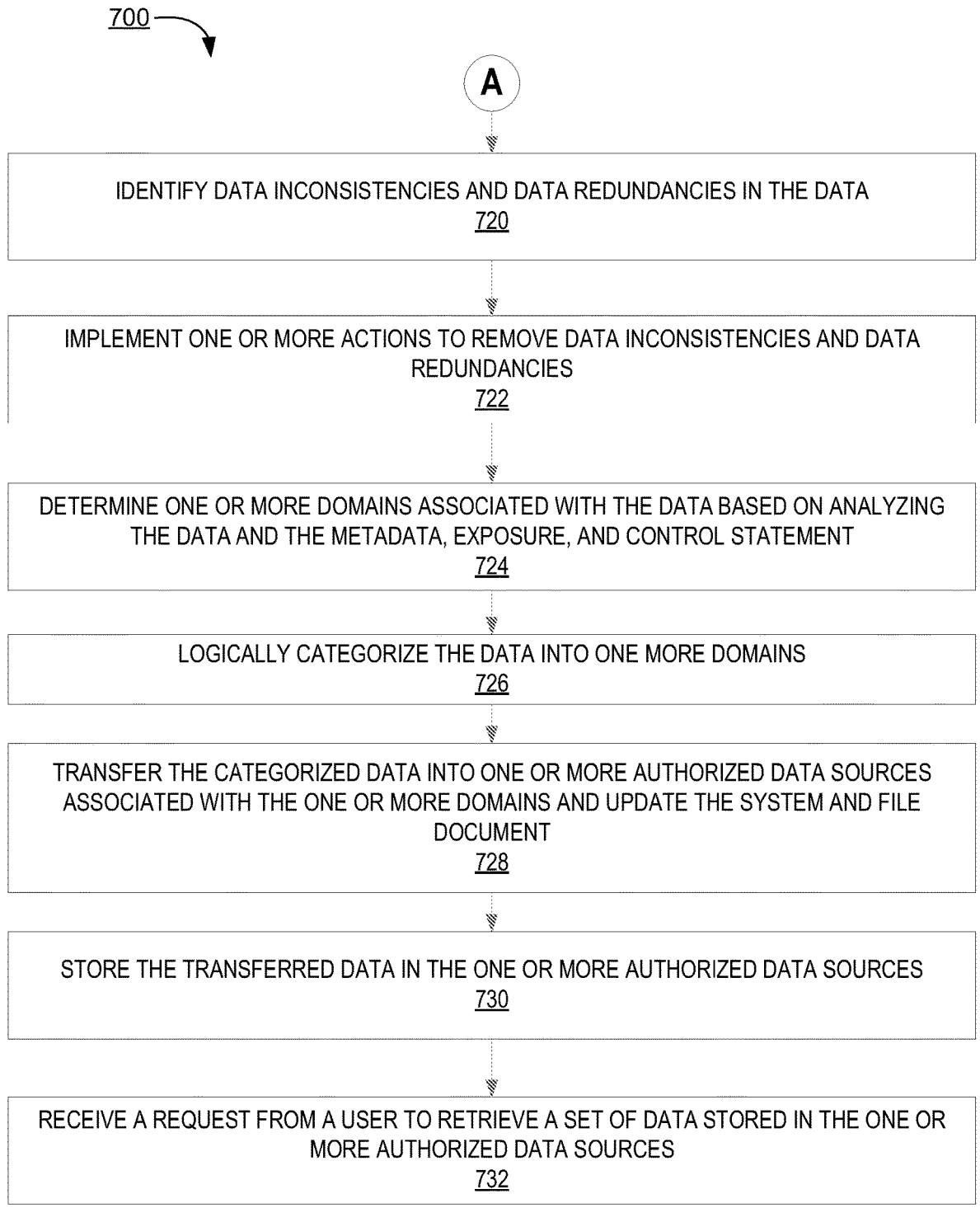
Figure 8A:
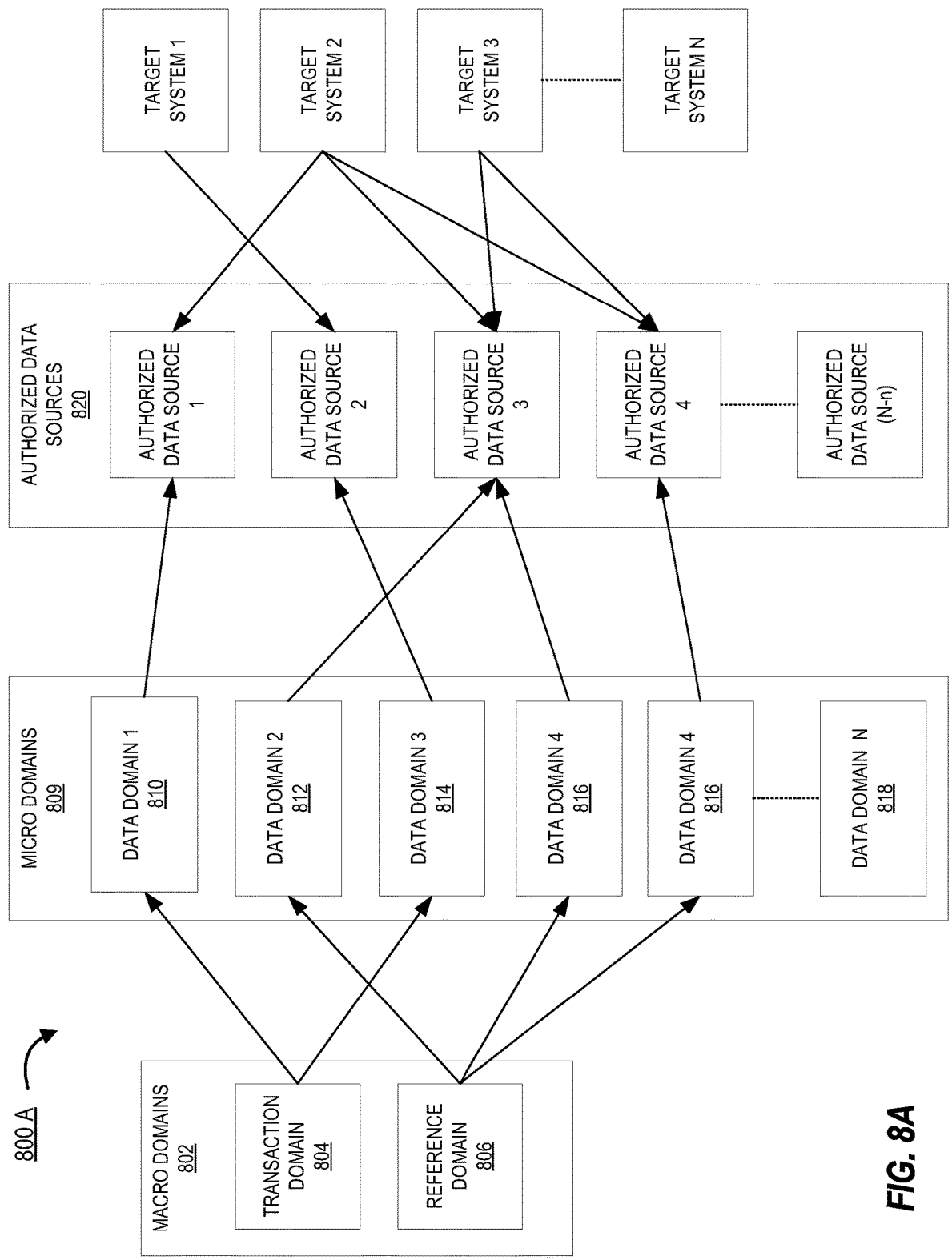
Figure 8B:
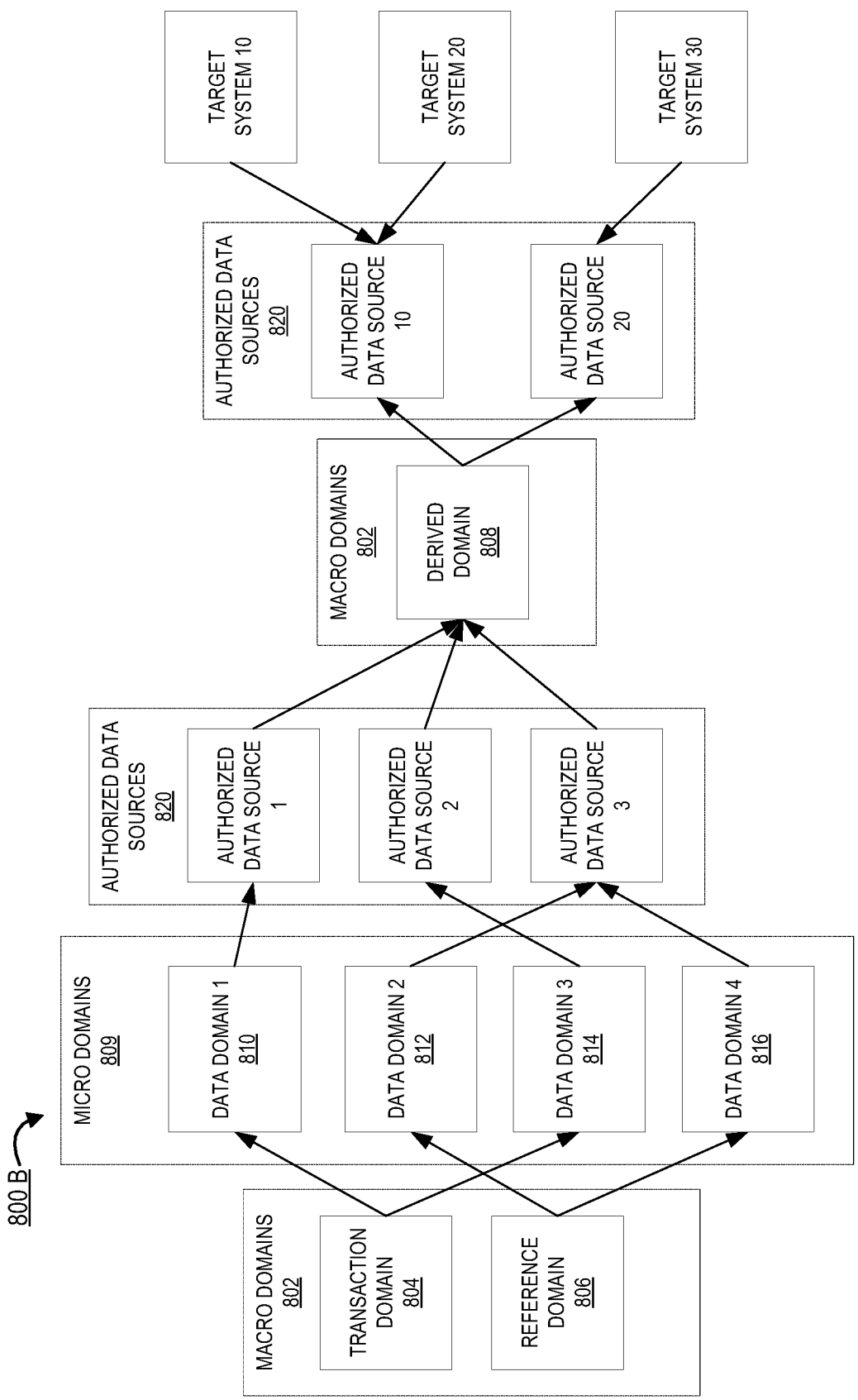
Figure 9:
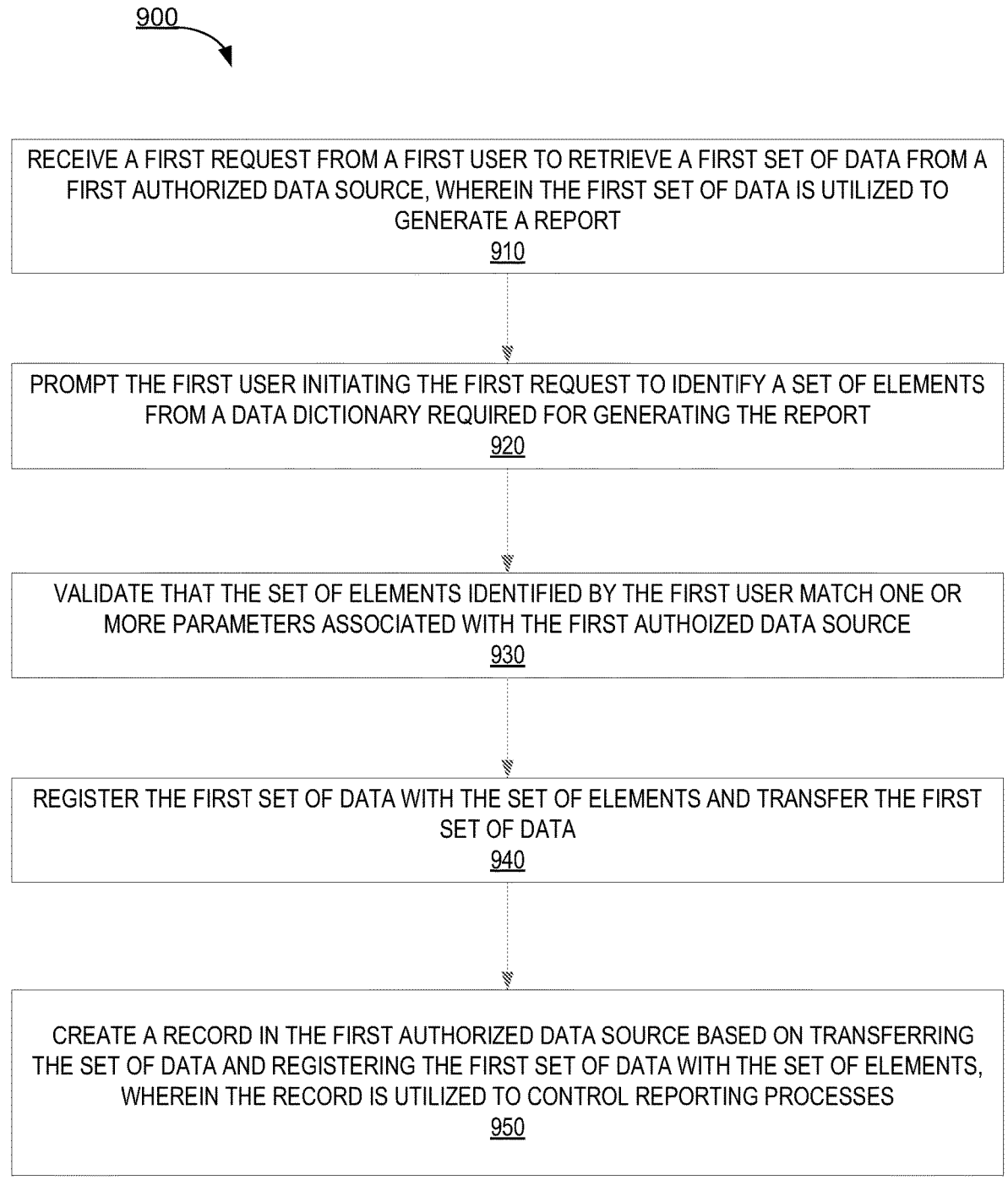
Figure 10:
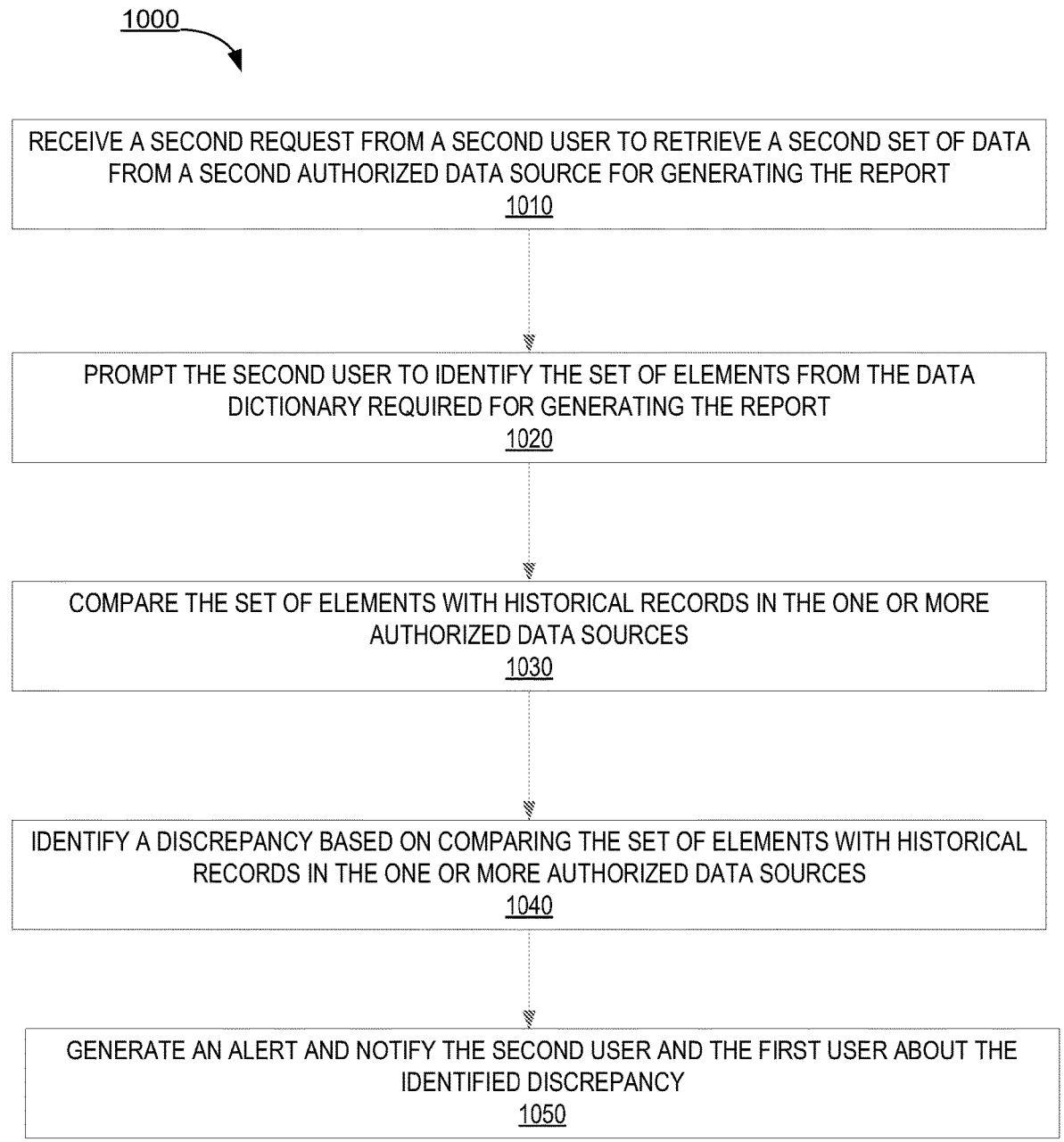

Having thus described embodiments of the invention in general terms, reference will be made to the accompanying drawings, where:

FIG. 1 presents a data governance system environment, in accordance with an embodiment of the present invention;

FIG. 2 presents a block diagram illustrating a computing device, in accordance with an embodiment of the present invention;

FIG. 3 presents a block diagram illustrating a data governance system, in accordance with an embodiment of the present invention;

FIG. 4 presents a block diagram illustrating an entity system, in accordance with an embodiment of the present invention;

FIG. 5 presents a process diagram illustrating data flow in the entity facilitated by the data governance system, in accordance with an embodiment of the present invention;

FIG. 6 presents a process diagram illustrating the data flow and multiple systems participating in one or more process flows implemented by the data governance system, in accordance with embodiments of the present invention;

FIG. 7A presents a process flow illustrating data flow and governance of data within the entity, in accordance with embodiments of the present invention;

FIG. 7B presents a process flow illustrating data flow and governance of data within the entity, in accordance with embodiments of the present invention;

FIG. 8A presents a process diagram illustrating distribution of data into one or more domains, in accordance with embodiments of the present invention;

FIG. 8B presents a process diagram illustrating distribution of data from authorized data sources associated with one or more domains as an input to a domain of the one or more domains, in accordance with embodiments of the present invention;

FIG. 9 presents a process flow illustrating the retrieval of data from one or more authorized data sources, in accordance with embodiments of the present invention; and FIG. 10 presents a process flow for identifying discrepancies in usage of the data stored in the one or more authorized data sources, in accordance with embodiments of the present invention.

DETAILED DESCRIPTION OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

Data Governance refers to the overall management of the availability, usability, integrity, and security of the data employed in an organization. The present invention defines a framework to establish personnel, policies, procedures, and organizational structures in place to make data accurate, consistent, and complete. Furthermore, the present invention addresses the transmission of different datasets within processes and applications that rely on the consumption of these data sets to complete business processes or transactions. The primary objective of data governance is to prevent mismanagement of information and data, by implementing an end to end structured data delivery strategy.

The present invention provides the functional benefit of defining data provisioning sources, capabilities and standards as enterprise owned, and to be designed to address enterprise needs. This is done by establishing the enterprise needs as the highest priority and focusing on emerging exposure data aggregation requirements. It is imperative that the data provisioning sources are sanctioned by the enterprise using one or more fact based criteria such as cost, content, quality, latency, security, or the like. In this regard, the present invention may design an open architecture to enable integration of data from one or more platforms and maximize flexibility to meet future needs.

Typically, data can be related to all facets of the business, such as customer transactions, company financial information, operational processes, inventory management, industry trends, and supplier transactions. Data is typically collected from internal sources, such as transaction systems, manufacturing processes, customer records, as well as external sources such as market data, the printed media, and the Internet.

In some embodiments, a "user" may be a financial institution employee (e.g., an underwriter, a project manager, an IT specialist, a manager, an administrator, an internal operations analyst, bank teller or the like) capable of operating the system described herein. In some other embodiments, a customer may be an employee in any business environment. For purposes of this invention, the term "user" and "customer" may be used interchangeably. In some embodiments, a "user" may be a financial institution customer (e.g., an account holder or a person who have an account (e.g., banking account, credit account, or the like)). In one aspect, a customer may be any individual who enters a financial institution environment. In some embodiments, the customer may be an individual who may be interested in opening an account with the financial institution. In some other embodiments, a customer may be any individual who enters a business environment.

In some embodiments, an "entity" as used herein may be a financial institution, data collection agency, or the like. For the purposes of this invention, a "financial institution" may be defined as any organization, entity, or the like in the business of moving, investing, or lending money, dealing in financial instruments, or providing financial services. This may include commercial banks, thrifts, federal and state savings banks, savings and loan associations, credit unions, investment companies, insurance companies and the like. In some embodiments, the entity may allow a customer to establish an account with the entity. An "account" may be the relationship that the customer has with the entity. Examples of accounts include a deposit account, such as a transactional account (e.g. a banking account), a savings account, an investment account, a money market account, a time deposit, a demand deposit, a pre-paid account, a credit account, or the like. The account is associated with and/or maintained by an entity. In other embodiments, an "entity" may not be a financial institution.

FIG. 1 provides a block diagram illustrating an environment 100 for a data governance system. As depicted in FIG. 1, the operating environment 100 may include a data governance system 300 interacting with an entity system 400, a user 500, a plurality of users 110, using a network 150 that includes an internet 151 and wireless telephone network 152. In some embodiments, the data governance system 300 may be maintained by an entity. In some embodiments, the data governance system 300 may be owned and maintained by the entity. In some embodiments, the data governance system 300 may be a part of the entity system 400. In some embodiments, the user 105 and plurality of users 110 may be employees of the entity. In some embodiments, the system environment may include other third party systems and other entity systems. In some embodiments, the data governance system 300 may interact with a plurality of users associated with the entity or a third party.

The environment 100 also may include a plurality of computing devices. The computing devices may include any machine, apparatus, system or the like that may be connected to and communicate with other devices over a network 150. In one embodiments of the invention, the data governance system 300 interacts with multiple computing devices 200, wherein the computing devices may be either one of source systems or target systems associated with the user 105 and the plurality of users 110. The computing device 200 may include a personal computer such as a desktop computer, laptop computer, tablet or any type of personal computing device that may be connected to a network by landline or wireless access such as wireless local area network (WLAN) such as Wi-Fi based on the Institute of Electrical and Electronics Engineers' (IEEE) 802.11 standards, Bluetooth short-wavelength UHF radio waves in the ISM band from 2.4 to 2.485 GHz or other wireless access technology. In some embodiments, the system environment 100 may include other source systems 120 which provide input data to the data governance system 300. In some embodiments, the system environment may include other storage systems 130.

Referring now to FIG. 2, the computing device 200 also includes various features, such as a network communication interface 210, a processing device 220, a user interface 230, and a memory device 250. The network communication interface 210 includes a device that allows the computing device 200 to communicate over the network 150 (shown in FIG. 1). In one embodiment of the invention, a network browsing application 255 provides for a user to establish network communication with the entity system 400 and data governance system 300.

As used herein, a "processor" or "processing device," such as the processing device 220, generally refers to a device or combination of devices having circuitry used for implementing the communication and/or logic functions of a particular system. For example, a processing device 220 may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device 220 may further include functionality to operate one or more software programs based on computer-executable program code thereof, which may be stored in memory device 250. As the phrase is used herein, a processor or processing device may be "configured to" perform a certain function in a variety of ways, including, for example, by having one or more general-purpose circuits perform the function by executing particular computer-executable program code embodied in computer-readable medium, and/or by having one or more application-specific circuits perform the function.

As used herein, a "user interface" generally includes a plurality of interface devices and/or software that allow a customer to input commands and data to direct the processing device to execute instructions. For example, the user interface 230 presented in FIG. 2 may include a graphical user interface (GUI) or an interface to input computer-executable instructions that direct the processing device 220 to carry out specific functions. The user interface 230 employs certain input and output devices as previously described with reference to FIG. 1. These input and output devices may include a display, mouse, keyboard, button, touchpad, touch screen, microphone, speaker, LED, light, joystick, switch, buzzer, bell, and/or other user input/output device for communicating with one or more users.

As used herein, a "memory" or "memory device" generally refers to a device or combination of devices that store one or more forms of computer-readable media for storing data and/or computer-executable program code/instructions. Computer-readable media is defined in greater detail below. For example, in one embodiment, the memory device 350 includes any computer memory that provides an actual or virtual space to temporarily or permanently store data and/or commands provided to the processing device 220 when it carries out its functions described herein. The memory device 250 may include such applications as a conventional network browsing application 255, an entity application 256, a data governance application 258 and/or the like. The entity application 256 may be used to allow communication with an entity system, such as the entity system 400. The data governance application 258 may be used to allow communication with the data governance system 300 and the entity system 400 to implement one or more actions.

FIG. 3 presents a block diagram illustrating the data governance system 300, in accordance with embodiments of the invention. As illustrated in FIG. 3, in one embodiment of the invention, the data governance system 300 includes one or more processing devices 320 operatively coupled to a network communication interface 310 and a memory device 350. In certain embodiments, the data governance system 300 is operated by an entity, such as a financial institution.

It should be understood that the memory device 350 may include one or more databases or other data structures/repositories. The memory device 350 also includes computer-executable program code that instructs the processing device 320 to operate the network communication interface 310 to perform certain communication functions of the data governance system 300 described herein. For example, in one embodiment of the data governance system 300, the memory device 350 includes, but is not limited to, a network server application 370, a data transfer application 360, a control application 380, exposure analyzer application 385, data storage application 383, and an entity application 390 including a web server application 393, and other computer-executable instructions or other data. The computer-executable program code of the network server application 370, the data transfer application 360, the control application 380, the exposure analyzer application 385 or the web server application 393 may instruct the processing device 320 to perform certain logic, data-processing, and data-storing functions of the data governance system 300 described herein, as well as communication functions of the data governance system 300. The entity application 390 communicates with the computing device 200 to facilitate communication between the user and the entity. The data transfer application 360 facilitates transfer of data between multiple systems as illustrated in FIG. 5. Control application 380 facilitates implementation of multiple control functions on the data and the transfer of data based on parameters set by the entity system 400 or the data governance system 300. Exposure analyzer application 385 facilitates identification of exposure elements associated with the data based on the parameters set by the entity system 400 or the data governance system 300. Data storage application 383 may facilitate storage of the data received from one or more system illustrated in the system environment 100. The data governance system 300 may include other modules to facilitate data storage. The data governance system 300 may include other internal or external memory devices (not shown) to facilitate data storage, wherein external memory devices may include but are not limited to external hard drives, discs, thumb drives, other server system used for data storage.

As used herein, a "communication interface" generally includes a modem, server, transceiver, and/or other device for communicating with other devices on a network. The network communication interface 310 is a communication interface having one or more communication devices configured to communicate with one or more other devices on the network 150, such as the computing device 200. The processing device 320 is configured to use the network communication interface 310 to transmit and/or receive data and/or commands to and/or from the other devices connected to the network 150.

Furthermore, as used herein, a "memory device" generally refers to a device or combination of devices that store one or more forms of computer-readable media and/or computer-executable program code/instructions. Computer-readable media is defined in greater detail below. For example, in one embodiment, the memory device 350 includes any computer memory that provides an actual or virtual space to temporarily or permanently store data and/or commands provided to the processing device 320 when it carries out its functions described herein.

In some embodiments, workflow data or other data such as work assignments, and the like may be stored in a non-volatile memory distinct from instructions for executing one or more process steps discussed herein that may be stored in a volatile memory such as a memory directly connected or directly in communication with a processing device executing the instructions. In this regard, some or all the process steps carried out by the processing device may be executed in near-real-time, thereby increasing the efficiency by which the processing device may execute the instructions as compared to a situation where one or more of the instructions are stored and executed from a non-volatile memory, which may require greater access time than a directly connected volatile memory source. In some embodiments, one or more of the instructions are stored in a non-volatile memory and are accessed and temporarily stored (i.e., buffered) in a volatile memory directly connected with the processing device where they are executed by the processing device. Thus, in various embodiments discussed herein, the memory or memory device of a system or device may refer to one or more non-volatile memory devices and/or one or more volatile memory devices.

FIG. 4 provides a block diagram illustrating the entity system 400, in greater detail, in accordance with embodiments of the invention. As illustrated in FIG. 4, in one embodiment of the invention, the entity system 400 includes one or more processing devices 420 operatively coupled to a network communication interface 410 and a memory device 450. In certain embodiments, the entity system 400 is operated by an entity, such as a financial institution.

It should be understood that the memory device 450 may include one or more databases or other data structures/repositories. The memory device 450 also includes computer-executable program code that instructs the processing device 420 to operate the network communication interface 410 to perform certain communication functions of the entity system 400 described herein. For example, in one embodiment of the entity system 400, the memory device 450 includes, but is not limited to, a network server application 460, an authentication application 470, authentication data 475, a data governance application 480, a data transfer application 485, and other computer-executable instructions or other data. The computer-executable program code of the network server application 460, the authentication application 470, the data governance application 480, or the data transfer application 485 may instruct the processing device 420 to perform certain logic, data-processing, and data-storing functions of the entity system 400 described herein, as well as communication functions of the entity system 400.

In one embodiment, the network server application 460, the authentication application 470 is configured to invoke or use the customer authentication data 475 when authenticating a user to the entity system 400. In some embodiments, the data governance application 480 allows communication with the data governance system 300 using the network communication interface 410. In one embodiment, the entity system 400 may be act as a source to provide the data. In such an embodiment, data transfer application 485 facilitates transfer of data. In another embodiment, the entity system 400 may act as a input system to receive data from the user. In such an embodiment, the web server application 493 facilitates the process of receiving the input of data from the user, wherein the user may be an employee or a customer of the entity.

As used herein, a "communication interface" generally includes a modem, server, transceiver, and/or other device for communicating with other devices on a network. The network communication interface 410 is a communication interface having one or more communication devices configured to communicate with one or more other devices on the network 150, such as computing device 200. The processing device 420 is configured to use the network communication interface 410 to transmit and/or receive data and/or commands to and/or from the other devices connected to the network 150.

FIG. 5 provides a block diagram 500 illustrating the data flow in the entity facilitated by the data governance system 300. As shown in the FIG. 5, the data flow is categorized into three parts, capture 525, transport 550, usage 575. Capture 525 illustrates the initial capture of the data, wherein the data may be any type of data including transaction data, reference data, financial data, mortgage application data, loan application data, and/or the like. Capture of data 525 is initiated when the system receives source document 505 from one or more source systems. The source systems may be computing device 200, entity system 400, other internal servers, and/or the like. The computing device 200 may be any computing device used by employees of financial centers associated with the entity, customers of the entity, or employees of the entity including application developers, data administrators, and/or the like. In some embodiments, source document 505 may be an application form, a data file, and/or the like. For example, a customer of the entity may fill out a loan application form and submit it to the entity system 400 via a computing device and the entity system 400 may transfer the loan application form to the data governance system. In some embodiments, the system stores the source document 505 in the memory 350. In some embodiments, the source documents 505 may be received from multiple source systems. In some embodiments, the system receives multiple source documents and has the ability to receive and process more than one source document at a time. As shown, the next step in the process of capture 525 is exposure analysis 510. The system performs an exposure analysis 510 on the data in the source document 505 using the exposure analyzer application 385, wherein the exposure analysis 510 identifies exposure elements associated with the data. In some embodiments, a user runs the exposure analyzer application 385 and provides necessary inputs to the exposure analyzer application. In some embodiments, the system automatically runs the exposure analyzer application 385 without requiring any input from the user. In some embodiments, the exposure analyzer application 385 performs exposure analysis 510 to identify exposure elements based on historical data. In some other embodiments, the exposure analyzer application 385 performs exposure analysis 510 to identify exposure elements based on the type of data and parameters set by the entity. The exposure elements may be regulatory, reputational, financial, credit, strategic, operational, and/or the like.

As shown in block 515, the system imposes controls on the data. The controls are based on the type of data and parameters set by the entity. For example, transaction data has a defined set of controls and reference data has a different defined set of controls. In some embodiments, the controls may define data lineage. In some other embodiments, the controls may be access to amend the data. In some embodiments, the system imposes unique set of controls on the data based on the type of identified exposure elements associated with the data. In such an embodiment, the system imposes controls to mitigate the identified exposure elements. For example, the system may impose controls on the data such that the controls may transfer the data to a specific group of users or specific systems of originations to mitigate the identified exposure elements. In some embodiments, a user may implement a series of steps to mitigate the exposure elements. Each of the exposure elements may have a unique set of controls. Based on exposure analysis and implementation of control functions, the system generates a metadata, exposure, and control statement which comprises metadata, identified exposure elements, and imposed control functions. In one embodiment, the entity uses a process classification framework for the capture process 525.

The data from the source document 505 is transferred to a system of origination 555 along with the metadata, exposure, and control statement as illustrated in transport block 550. The system of origination 555 may be a module stored in the memory 350 of the data governance system. In some other embodiments, the system of origination 555 may be an external module coupled to the data governance system. The system of origination 555 contains the data from the source document 505 and other information associated with the data including the origination of the data. The system performs quality testing after transferring the data into the system of origination. In some embodiments, quality testing includes determining whether controls are effective and in place before transferring the data to a system of record 560. The system transfers the data to the system of record after verifying that the data meets a set of rules set by the entity. The system of record 560 may be a module stored in the memory 350 of the data governance system 300. In some other embodiments, the system of record 560 may be an external system coupled to the data governance system. In some embodiments, the system of record 560 may be an independent system such as the other storage system 130 shown in FIG. 1 and a part of the system environment 100. In some embodiments, the system of record 560 has the ability to categorize the data into one or more domains. In some embodiments, the system of record 560 is capable of implementing processes to categorize the data into one or more domains based on the instructions received from the data governance system. The system transfers the data from the system of record to an authorized data source 565 based on the categorization of data into a domain, wherein the authorized data source is associated with the domain. In some embodiments, the authorized data source 565 may be a module stored in the memory 350 of the data governance system. In some other embodiments, the authorized data source 565 may be an external module coupled to the data governance system 300. In some embodiments, the authorized data source 565 may be an independent system such as other storage systems 130 shown in FIG. 1 and a part of the system environment 100. In some embodiments, the authorized data source 565 is a geographically separated system. In such an embodiment, transfer of data from the system of record to the authorized data source is a physical transfer of data.

In some embodiments, the data stored in the authorized data source 565 is retrieved by multiple target systems in usage block 575. The system imposes reporting process controls 580 on the data, wherein the reporting process controls ensure that the data used for reporting process 585 is accurate and appropriate. In some embodiments, the data may be used as an input for another process and is not limited to reporting process. The data stored in the authorized data sources may be used for generating reports, performing analysis and calculating estimates, and/or the like.

FIG. 6 provides a process diagram 600 illustrating the data flow and multiple systems participating in the process flows implemented by the system. FIG. 6 illustrates multiple source systems 602 (Source System 1, Source System 2, . . . Source System N) to capture the data from multiple users. The multiple users may be customers of the entity or employees of the entity. The system implements data flow mapping 620 which includes the functionalities of block 510, block 515, and block 555 illustrated in FIG. 5. The system transfers the data from multiple source systems to multiple systems of record 604 (System of Record 1, System of Record 2, . . . System of Record N). The system implements domain mapping 640 to categorize the data into different domains and transfers the categorized data into multiple authorized data sources 606 (Authorized Data Source 1, Authorized Data Source 2, . . . Authorized Data Source N). The system then implements regulatory mapping 660 to transfer appropriate data to multiple target systems (Target System 1, Target System 2, . . . Target System D). In one exemplary embodiment, a user of Target System 1 requests transfer of a set of data from any of the authorized data sources and based on receiving the request from the user, the system transfers the set of data to the Target System 1. Target System 1 may be a computing device of the user, wherein the user may be a report owner who prepares regulatory reports using the set of data transferred from the Authorized Data Sources. Regulatory mapping 660 is described in FIG. 9 and FIG. 10.

FIG. 7A provides a process flow illustrating the data flow and governance of data within the entity 700. As shown in block 702, the system receives data from one or more source systems. The source systems may be third party systems, customer computing devices, employee computing devices, and/or the like. The data may be any type of data including transaction data, reference data, financial data, mortgage application data, loan application data, and/or the like. As shown in block 704, the system verifies that the data received from one or more data sources meets a set of rules. The set of rules may be any rules implemented by the entity based on entity requirements to ensure quality of the data is above a defined value. In some embodiments, verification of the data comprises determining whether the data is complete. In some embodiments, verification of the data comprises determining whether all the fields of the data are complete. For example, wherein the source document providing the data is a mortgage loan application filled by the user. The system determines whether all fields in the mortgage loan application are complete. In some embodiments, the system performs data testing, wherein the data testing may include number check, data check, precision check, data check, null check, and/or the like.

As shown in block 706, the system generates a metadata statement based on verifying that the data meets the set of rules. In some embodiments, the metadata statement generated is based on a metadata template, wherein metadata template ensures that the metadata statements generated by the system are identical in order to improve the processing efficiency. For example, the system includes the metadata template in the memory and based on the origination of the data, the system completes all one or more fields in the metadata template. The metadata statement may be used by the system to ensure that the data is being transferred from one system to another system in a timely manner.

As shown in block 708, the system performs exposure analysis on the data and generates an exposure statement, wherein the exposure statement comprises exposure elements pertaining to the data. The exposure elements may be regulatory, reputational, financial, credit, strategic, operational, and/or the like. The system generates the exposure statement containing the exposure elements. In one embodiment of the invention, the exposure statement is used by a user to mitigate the exposure elements. Mitigating the exposure elements may include one or more steps to reduce, avoid, accept or transfer the exposures.

As shown in block 710, the system implements control functions to the data and generates a control statement. Control functions may be implemented to control the data flow within the entity, control the ability of the users or systems to amend the data, and/or the like. For example, the system places controls on the data to regulate the flow of the data to a system, a process, or a user. In some embodiments, the control functions may be based on the type of data. For example, the system places different controls on transactions and reference data. In some embodiments, the control functions may be based on the exposure elements identified by the system.

As shown in block 712, the system transfers the data and the metadata, exposure, and control statement to a system of origination. The system of origination comprises information about the type of data, involved exposure elements, controls implemented on the data, origination of the data, and/or the like. In some embodiments, the system performs quality testing to ensure that appropriate controls are in place. For example, the system compares the controls imposed on the data with the standard set of controls required for the type of data to ensure that appropriate controls are in place. The standard set of controls required for the type of data are stored in the memory of the system.

As shown in block 714, the system validates the metadata, exposure, and control statement stored in the system of origination. For example, the system validates that the metadata, exposure elements, and imposed controls are documented appropriately. In some embodiments, the system may check the metadata, exposure, and control statement to verify if the data is being transferred from source systems to system of origination within a time period "A", wherein the time period "A" is defined in the metadata, exposure, and control statement. In some embodiments, the system may define a time period "B" for transferring the data from system of origination to authorized data sources. As shown in block 716, the system transfers the data, and the metadata, exposure, and control statement to a system of record. In some embodiments, the system of record may be a part of system capable of performing logical operations to categorize the data. In some other embodiments, the system for record may be an independent system capable of performing logical operations to categorize the data based on instructions received from the system. As shown in block 718, the system creates a system and file document based on transferring the data from the system of origination to the system of record. The system and file document comprises information about the flow of the data within the entity, wherein the information includes file name of the source document and system name.

Next, as illustrated in FIG. 7B, the process 700 continues by identifying data inconsistencies and data redundancies in the data, as illustrated in block 720. The system performs filtering of the data to identify duplicate data and inconsistent data. In some embodiments, inconsistent data may be mismatch in the type of data required in a field and the data present in the field. For example, the type of data required in the field may be percentage data and the data existing in the field may be string data. The system identifies such inconsistencies in the type of data required and the existing data. As shown in block 722, the system implements one or more actions to remove data inconsistencies and data redundancies. The one or more actions may be deleting the data, reconciling the data, and/or the like.

As shown in block 724, the system determines one or more domains associated with the data based on analyzing the data and the metadata, exposure, and control statement, wherein the one or more domains comprise at least a transaction domain, and a reference domain. Typically, the data domains are used to categorize data types and data structures within the entity. In some embodiments, transaction data may refer to business transactions that are captured during business operations and processes, such as purchase records, inquiries, and payments. Reference data may refer to internally managed or externally sourced facts to support an entity's ability to effectively process transactions, manage master data, and provide decision support capabilities. Geo data and market data are among the most commonly used reference data. These one or more data domains are a single, reliable, and official source of data and information for one or more target systems. The type of controls implemented for different type of data and data in different domains varies. Based on the type of data and the type of controls implemented on the data, the system identifies one or more domains associated with the data.

As shown in block 726, the system logically categorizes the data into one or more domains based on one or more data capabilities of each domain, wherein the data capabilities comprise at least data security, data access, reporting and analytics, and data management and control. In one embodiment, the system logically categorizes the data based on the metadata, exposure, and control statement. For example, the metadata, exposure, and control statement may include information associated with the origination of the data and type of the data, the system categorizes the data into one or more domains based on the origination of the data and the type of the data. In one embodiment, logical classification of the data comprises matching the type of data with keywords or data types associated with each domain using logical operators, and/or the like. In some embodiments, the system determines one or more data types associated with each of the one or more domains. Typically, a data type is a classification identifying one of various types of data for defining and implementing them. In one aspect, a data type may be associated with each of the one or more domains. For example, a transaction domain may include one or more data types such as brokerage and trust, mortgage, consumer credit, cards, deposits, or the like. In another example, a reference domain may include one or more data types such as customer/client account relationship, product, chart of accounts, or the like.

As shown in block 728, the system transfers the categorized data into one or more authorized data sources associated with the one or more domains and updates the system and file documentation. Each domain may be associated with multiple authorized data sources, as further illustrated in FIG. 8. In one embodiment, the transfer of data into one or more authorized data sources may be a physical transfer of data. The system transfers the data into one or more authorized data sources and updates the system and file documentation to include the file name, file lineage, the name of the authorized data source and the name of the system of record. In some embodiments, the authorized data source may be a data server. In some embodiments, the system transfers the data within the entity used a shared Network Data Mover (NDM).

As shown in block 730, the system stores the transferred data in the one or more authorized data sources. In some embodiments, the system stores the data and marks the data as certified data. In some embodiments, the system stores the metadata, exposure, and control document and the system and file document along with the data in an authorized data source. As shown in block 732, the system receives a request from a user to retrieve a set of data stored in the one or more authorized data sources. In some embodiments, the request may be initiated by a target system automatically.

FIG. 8A illustrates a process diagram 800A for distribution of data into one or more domains. As shown in FIG. 8A, the data in the entity is divided into two macro level domains, as illustrated in block 802. In some embodiments there are three macro level domains. In other embodiments there are more than three macro level domains. In yet other embodiments, there are less than 3 macro level domains. In one embodiment, the three macro level domains include a transaction domain, reference domain, and derived domain (shown in FIG. 8B). The data is sub-divided into micro level domains (Data Domain 1 810, Data Domain 2 812, Data Domain 3 814, Data Domain 4 816, . . . Data Domain N 818). Each Macro level domain is associated with one or more unique micro level domains 809. For example, the data in Macro Domain 1 is sub-divided and stored in Data Domain 1 810 and Data Domain 3 814, wherein the macro domain 1 may be a transaction domain 804 and the data domain 1 810 may include mortgage data and data domain 3 814 may include savings account transaction data. Each micro level domain 809 is linked with any of the Authorized Data Sources 820. For example, Data Domain 1 is linked with Authorized Data Source 1 and Data Domain 3 is linked with Authorized Data Source 2. In some embodiments, the number of Authorized Data Sources is less than the number of Data Domains in the entity. Therefore, cross mapping exists between data domains and authorized data sources. For example, many to one relationship exists between data domains and authorized data sources. As shown in the figure, Data Domain 2 812 and Data Domain 4 816 are associated with same Authorized Data Source 3. In some other embodiments, the number of Authorized Data Sources is same as the number of Data Domains in the entity. As shown in the figure, the data from the authorized data sources is retrieved by multiple target systems and used for generating reports, updating ledgers, performing analysis and as an input to a macro domain such as a derived domain for estimation of financial (shown in FIG. 8B), and/or the like.

FIG. 8B presents a process diagram 800B illustrating distribution of data from authorized data sources associated with one or more domains as an input to a domain of the one or more domains, in accordance with embodiments of the present invention. As shown in the figure, the data associated with transaction domain 804 and reference domain 806 is transferred as input to a system associated with the derived domain 808. Derived Domain 808 is one of the macro domains 802 receiving input from Authorized Data Source 1, Authorized Data Source 2, and Authorized Data Source 3. In one embodiment, the derived domain 808 calculates financial data taking input from Authorized Data Source 1 associated with Transaction Domain 4. In another embodiment, the derived domain 808 calculates data taking input from Authorized data Source 2 and Authorized Data Source 3 associated with both reference domain 806 and transaction domain 804. The calculated data associated with derived domain 808 is transferred to Authorized Data Sources 820 (Authorized Data Source 10 and Authorized Data Source 20). The data stored in Authorized Data Source 10 and Authorized Data Source 20 is retrieved by multiple target systems (Target System 10, Target System 20, and Target System 30) for generating reports and/or the like.

FIG. 9 presents a process flow 900 illustrating the retrieval of data from one or more authorized data sources. As shown in block 910, the system receives a first request from a first user to retrieve the first set of data from a first authorized data source, wherein the first set of data is utilized to generate a report. For example, the system receives a request from a first regulatory report owner to retrieve a first set of data from an authorized data source. As shown in block 920, the system prompts the user initiating the first request to identify a set of elements from a data dictionary required for generating the report. The data dictionary comprises key elements and definitions of the key elements associated with fields in multiple reports generated by the entity. As shown in block 930, the system validates the set of elements identified by the first user based on matching the set of elements with one or more parameters associated with the first authorized data source. For example, the system verifies whether the set of elements associated with the report match one or more parameters associated with the authorized data source. The one or more parameters may be keywords associated with the domain linked to the authorized data source. As shown in 940, the system registers the first set of data with the set of elements and transfers the first set of data. Registering the first set of data implies associating the set of elements with the first set of data utilized for a particular reporting process. As shown in block 950, the system 300 creates a record in the first authorized data source based on transferring the first set of data and registering the first set of data with the set of elements, wherein the record is utilized to control reporting processes. The record may include details about the type of report and the type of data transferred from the first authorized data source.

In one exemplary embodiment, the system receives a request from a target system to retrieve transaction data from one or more authorized data sources associated with the transaction domain to update a general ledger. In such an embodiment, the system 300 implements a three way reconciliation control for transferring the data to the general ledger. The three way reconciliation is a method of consistency control to ensure that no data gaps exist. The three way reconciliation control process includes reconciliation of data from the system of origination to the system of record, the system of record to the authorized data source, and from the authorized data source to the general ledger. For example, the system verifies that the data in the authorized data source used for updating the general ledger is linked with the transaction domain. If the data in the authorized data source is not linked with the transaction domain, the system performs the three way reconciliation control process to update the authorized data source with appropriate data linked with transaction domain. In another example, the data stored in the authorized data source may be incomplete. In such an exemplary embodiment, the system performs the three way reconciliation control process to fill the data gaps before updating the general ledger.

FIG. 10 presents a process flow 1000 for identifying discrepancies in the usage of data stored in the authorized data sources. As shown in block 1010, the system receives a second request from a second user to retrieve a second set of data from a second authorized data source for generating the report. For example, parts of a main regulatory report may be created by multiple groups, wherein the main regulatory report may have multiple report owners. Each report owner is responsible for creating a part of the main regulatory report. As explained in FIG. 9, the first report owner may retrieve the first set of data from the first authorized data source. A second report owner also associated with the main regulatory report, may raise a second request to retrieve the second set of data from the second authorized data source. As shown in block 1020, the system prompts the second user to identify the set of elements from the data dictionary required for generating the report. For example, the system prompts the second report owner to identify the set of elements associated with the main regulatory report. As shown in block 1030, the system compares the set of elements with historical records in the one or more authorized data sources. For example, the system compares the set of elements with historical data to identify the type of data retrieved for generating the main regulatory report associated with the set of elements. As shown in block 1040, the system identifies a discrepancy based on comparing the set of elements with historical records in the one or more authorized data sources. For example, the system identifies that the first report owner has used the first set of data to generate the report associated with the set of elements, whereas the second report owner has raised a request to retrieve the second set of data for generating the same report associated with the set of elements. As shown in block 1050, the system generates an alert and notifies the second user and the first user about the identified discrepancy. For example, the system notifies the second report owner that the first report owner has used the first set of data for generating the report associated with the set of elements. In some embodiments, the system also provides the contact information of the first report owner to the second report owner. In some embodiments, the system also initiates a communication link between the first report owner and the second report owner to resolve to the discrepancy.

In accordance with embodiments of the invention, the term "module" with respect to a system may refer to a hardware component of the system, a software component of the system, or a component of the system that includes both hardware and software. As used herein, a module may include one or more modules, where each module may reside in separate pieces of hardware or software.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for electronic data verification, storage, and transfer, wherein the system comprises:
    a computer apparatus including a processor and a memory; and
    a module stored in the memory, comprising executable instructions that when executed by the processor cause the processor to:
        receive data from one or more source systems;
        verify that the data received from the one or more source systems meets a set of rules, wherein the set of rules are based on entity requirements, wherein verifying further comprises performing domain mapping for categorization of data into multiple authorized data sources;
        generate a metadata, exposure, and control statement in response to verifying that the data received from the one or more source systems meets the set of rules;
        transfer the data and the metadata, exposure, and control statement to a system of origination;
        validate the data and the metadata, exposure and control statement stored in the system of origination;
        transfer the data and the metadata, exposure, and control statement from the system of origination to a system of record;
        create a system document and file document based on the transferring of the data from the system of origination to the system of record;
        distribute the data in the system of record into one or more domains based on the metadata, exposure, and control statement;
        transfer the data into one or more authorized data sources associated with the one or more domains based on the logical distribution of the data;
        receive a first request from a first user to retrieve a first set of data from a first authorized data source of the one or more authorized data sources, wherein the first set of data is utilized to generate a report;
        prompt the first user initiating the first request to identify a set of elements from a data dictionary required for generating the report;
        create a record in the first authorized data source based on transferring the set of data and registering the set of elements with the first set of data, wherein the record is utilized to control reporting processes;
        receive a second request from a second user to retrieve a second set of data from a second authorized data source of the one or more authorized data sources for generating the report;
        identify a discrepancy based on comparing the set of elements with historical records in the one or more authorized data sources; and
        generate an alert and notify the second user and the first user about the identified discrepancy.

2. The system of claim 1, wherein the executable instructions that when executed by the processor cause the processor to:
    validate that the set of elements identified by the user match one or more parameters associated with the first authorized data source; and
    register the set of elements with the first set of data and transfer the first set of data.

3. The system of claim 1, wherein the executable instructions that when executed by the processor cause the processor to:
    prompt the second user to identify the set of elements from the data dictionary required for generating the report;
    compare the set of elements identified by the user with historical records in the one or more authorized data sources; and
    identify a discrepancy based on comparing the set of elements with the historical records in the one or more authorized data sources.

4. The system of claim 1, wherein the executable instructions that when executed by the processor cause the processor to:

analyze the data to identify data inconsistencies and data redundancies; and implement one or more actions to eliminate data inconsistencies and data redundancies, wherein the one or more actions comprises at least reconciling the data.

5. The system of claim 1, wherein the executable instructions that when executed by the processor cause the processor to create a system and file document based on transferring the data from the system of origination to the system of record.

6. The system of claim 5, wherein the executable instruction that when executed by the processor cause the processor to update the system and file document based on transferring the data from the system of record to one or more authorized data sources.

7. The system of claim 1, wherein the executable instruction that when executed by the processor cause the processor to transfer the data via a shared network data mover.

8. A computer implemented method for electronic data verification, storage, and transfer, the method comprising:

receiving data from one or more source systems;

verifying that the data received from the one or more source systems meets a set of rules, wherein the set of rules are based on entity requirements, wherein verifying further comprises performing domain mapping for categorization of data into multiple authorized data sources;

generating a metadata, exposure, and control statement in response to verifying that the data received from the one or more source systems meets the set of rules;

transferring the data and the metadata, exposure, and control statement to a system of origination;

validating the data and the metadata, exposure and control statement stored in the system of origination;

transferring the data and the metadata, exposure, and control statement from the system of origination to a system of record;

creating a system document and file document based on the transferring of the data from the system of origination to the system of record;

distributing the data in the system of record into one or more domains based on the metadata, exposure, and control statement;

transferring the data into one or more authorized data sources associated with the one or more domains based on the logical distribution of the data;

receiving a first request from a first user to retrieve a first set of data from a first authorized data source of the one or more authorized data sources, wherein the first set of data is utilized to generate a report;

prompting the first user initiating the first request to identify a set of elements from a data dictionary required for generating the report;

creating a record in the first authorized data source based on transferring the set of data and registering the set of elements with the first set of data, wherein the record is utilized to control reporting processes;

receiving a second request from a second user to retrieve a second set of data from a second authorized data source of the one or more authorized data sources for generating the report;

identifying a discrepancy based on comparing the set of elements with the historical records in the one or more authorized data sources; and generating an alert and notify the second user and the first user about the identified discrepancy.

9. The method of claim 8 further comprises:

validating that the set of elements identified by the user match one or more parameters associated with the first authorized data source; and registering the set of elements with the first set of data and transfer the first set of data.

10. The method of claim 8 further comprises:

prompting the second user to identify the set of elements from the data dictionary required for generating the report;

comparing the set of elements identified by the user with historical records in the one or more authorized data sources; and identifying a discrepancy based on comparing the set of elements with the historical records in the one or more authorized data sources.

11. The method of claim 8 further comprises:

analyze the data to identify data inconsistencies and data redundancies; and implement one or more actions to eliminate data inconsistencies and data redundancies, wherein the one or more actions comprises at least reconciling the data.

12. The method of claim 8 further comprises creating a system and file document based on transferring the data from the system of origination to the system of record.

13. The method of claim 12 further comprises updating the system and file document based on transferring the data from the system of record to one or more authorized data sources.

14. The method of claim 8 further comprises transferring the data via a shared network data mover.

15. A computer program product comprising computer program code stored on a non-transitory computer-readable medium which is readable by a computer, said computer program product is used for electronic data verification, storage, and transfer, said computer program code comprising computer instructions to cause one or more computer processors to perform the operations of:

receiving data from one or more source systems;

verifying that the data received from the one or more source systems meets a set of rules, wherein the set of rules are based on entity requirements, wherein verifying further comprises performing domain mapping for categorization of data into multiple authorized data sources;

generating a metadata, exposure, and control statement in response to verifying that the data received from the one or more source systems meets the set of rules;

transferring the data and the metadata, exposure, and control statement to a system of origination;

validating the data and the metadata, exposure and control statement stored in the system of origination;

transferring the data and the metadata, exposure, and control statement from the system of origination to a system of record;

creating a system document and file document based on the transferring of the data from the system of origination to the system of record;

distributing the data in the system of record into one or more domains based on the metadata, exposure, and control statement;

transferring the data into one or more authorized data sources associated with the one or more domains based on the logical distribution of the data;

receiving a first request from a first user to retrieve a first set of data from a first authorized data source of the one or more authorized data sources, wherein the first set of data is utilized to generate a report;

prompting the first user initiating the first request to identify a set of elements from a data dictionary required for generating the report;

creating a record in the first authorized data source based on transferring the set of data and registering the set of elements with the first set of data, wherein the record is utilized to control reporting processes;

receiving a second request from a second user to retrieve a second set of data from a second authorized data source of the one or more authorized data sources for generating the report;

identifying a discrepancy based on comparing the set of elements with historical records in the one or more authorized data sources; and generating an alert and notify the second user and the first user about the identified discrepancy.

16. The computer program product of claim 15, wherein said computer program code comprising computer instructions to cause one or more computer processors to perform the operations of:

validating that the set of elements identified by the user match one or more parameters associated with the first authorized data source; and registering the set of elements with the first set of data and transfer the first set of data.

17. The computer program product of claim 15, wherein said computer program code comprising computer instructions to cause one or more computer processors to perform the operations of:

prompting the second user to identify the set of elements from the data dictionary required for generating the report;

comparing the set of elements identified by the user with historical records in the one or more authorized data sources; and identifying a discrepancy based on comparing the set of elements with the historical records in the one or more authorized data sources.

18. The computer program product of claim 15, wherein said computer program code comprising computer instructions to cause one or more computer processors to perform the operations of:

analyze the data to identify data inconsistencies and data redundancies; and implement one or more actions to eliminate data inconsistencies and data redundancies, wherein the one or more actions comprises at least reconciling the data.

19. The computer program product of claim 15, wherein said computer program code comprising computer instructions to cause one or more computer processors to perform the operations of creating a system and file document based on transferring the data from the system of origination to the system of record.

20. The computer program product of claim 19, wherein said computer program code comprising computer instructions to cause one or more computer processors to perform the operations of updating the system and file document based on transferring the data from the system of record to one or more authorized data sources.

* * * * *